(12) United States Patent
Chu-Carroll et al.

(10) Patent No.: US 8,892,550 B2
(45) Date of Patent: Nov. 18, 2014

(54) SOURCE EXPANSION FOR INFORMATION RETRIEVAL AND INFORMATION EXTRACTION

(75) Inventors: Jennifer Chu-Carroll, Hawthorne, NY (US); James J. Fan, Hawthorne, NY (US); Nico M. Schlaefer, Pittsburgh, PA (US); Wlodek W. Zadrozny, Tarrytown, NY (US)

(73) Assignees: International Business Machines Corporation, Armonk, NY (US); Nico M. Schlaefer, Pittsburgh, PA (US)

( * ) Notice: Subject to any disclaimer, the term of this patent is extended or adjusted under 35 U.S.C. 154(b) by 148 days.

(21) Appl. No.: 12/890,114

(22) Filed: Sep. 24, 2010

(65) Prior Publication Data

US 2012/0078895 A1    Mar. 29, 2012

(51) Int. Cl.
*G06F 17/30* (2006.01)
(52) U.S. Cl.
CPC .... *G06F 17/30964* (2013.01); *G06F 17/30637* (2013.01); *G06F 17/30646* (2013.01)
USPC ......................................................... 707/728
(58) Field of Classification Search
USPC ........................................................ 707/728
See application file for complete search history.

(56) References Cited

U.S. PATENT DOCUMENTS

| | | | |
|---|---|---|---|
| 3,559,995 A | 2/1971 | Steadman | |
| 4,594,686 A | 6/1986 | Yoshida | |
| 4,599,691 A | 7/1986 | Sakaki et al. | |
| 4,829,423 A | 5/1989 | Tennant et al. | |
| 4,921,427 A | 5/1990 | Dunn | |
| 5,384,894 A | 1/1995 | Vassiliadis et al. | |
| 5,414,797 A | 5/1995 | Vassiliadis et al. | |
| 5,513,116 A | 4/1996 | Buckley et al. | |

(Continued)

FOREIGN PATENT DOCUMENTS

| | | |
|---|---|---|
| EP | 0 513 638 | 11/1992 |
| EP | 1 284 461 | 2/2003 |

(Continued)

OTHER PUBLICATIONS

Philip Clarkson et al., "statistical Language Modeling Using the CMU-Cambridge Toolkit", 1997, Cambridge University, Engineering Dept.*

(Continued)

*Primary Examiner* — Usmaan Saeed
*Assistant Examiner* — Jagdish Pandya
(74) *Attorney, Agent, or Firm* — Scully, Scott, Murphy & Presser, P.C.; William Stock, Esq.

(57) ABSTRACT

System, method and computer program product for 1) preparing queries for retrieving related content based on existing data content. For instance, titles of existing documents or entities extracted from documents can be used as queries. 2) Retrieving content from other repositories of unstructured, semi-structured, or structured data. For instance, web pages can be retrieved using existing search engines. 3) Extracting smaller units of text from the retrieved content. For instance, web pages can be split into coherent paragraphs of text. 4) Judging the quality of the smaller units of text and their relatedness to existing data. For instance, paragraphs can be scored using a statistical model based on lexico-syntactic features and topic models. 5) Synthesizing new sources from high-quality related text. For instance, paragraphs that score above a threshold can be concatenated into a new document.

27 Claims, 7 Drawing Sheets

(56) References Cited

U.S. PATENT DOCUMENTS

| | | | |
|---|---|---|---|
| 5,546,316 A | 8/1996 | Buckley et al. | |
| 5,550,746 A | 8/1996 | Jacobs | |
| 5,559,714 A | 9/1996 | Banks et al. | |
| 5,675,710 A * | 10/1997 | Lewis | 706/12 |
| 5,677,993 A | 10/1997 | Ohga et al. | |
| 5,726,898 A | 3/1998 | Jacobs | |
| 5,768,142 A | 6/1998 | Jacobs | |
| 5,873,056 A | 2/1999 | Liddy et al. | |
| 5,875,110 A | 2/1999 | Jacobs | |
| 6,275,788 B1 | 8/2001 | Watanabe et al. | |
| 6,336,029 B1 | 1/2002 | Ho et al. | |
| 6,480,698 B2 | 11/2002 | Ho et al. | |
| 6,498,921 B1 | 12/2002 | Ho et al. | |
| 6,501,937 B1 | 12/2002 | Ho et al. | |
| 6,571,240 B1 | 5/2003 | Ho et al. | |
| 6,584,464 B1 | 6/2003 | Warthen | |
| 6,584,470 B2 | 6/2003 | Veale | |
| 6,631,377 B2 | 10/2003 | Kuzumaki | |
| 6,665,666 B1 | 12/2003 | Brown et al. | |
| 6,701,322 B1 | 3/2004 | Green | |
| 6,732,090 B2 | 5/2004 | Shanahan et al. | |
| 6,778,979 B2 | 8/2004 | Grefenstette et al. | |
| 6,810,375 B1 * | 10/2004 | Ejerhed | 704/9 |
| 6,816,858 B1 | 11/2004 | Coden et al. | |
| 6,820,075 B2 | 11/2004 | Shanahan et al. | |
| 6,829,603 B1 | 12/2004 | Chai et al. | |
| 6,829,605 B2 | 12/2004 | Azzam | |
| 6,859,800 B1 | 2/2005 | Roche et al. | |
| 6,865,370 B2 | 3/2005 | Ho et al. | |
| 6,928,425 B2 | 8/2005 | Grefenstette et al. | |
| 6,928,432 B2 | 8/2005 | Fagan et al. | |
| 6,947,885 B2 | 9/2005 | Bangalore et al. | |
| 6,957,213 B1 | 10/2005 | Yuret | |
| 6,983,252 B2 | 1/2006 | Matheson et al. | |
| 6,993,517 B2 | 1/2006 | Naito et al. | |
| 7,007,104 B1 | 2/2006 | Lewis et al. | |
| 7,031,951 B2 | 4/2006 | Mancisidor et al. | |
| 7,051,014 B2 | 5/2006 | Brill et al. | |
| 7,054,803 B2 | 5/2006 | Eisele | |
| 7,058,564 B2 | 6/2006 | Ejerhed | |
| 7,117,432 B1 | 10/2006 | Shanahan et al. | |
| 7,120,574 B2 | 10/2006 | Troyanova et al. | |
| 7,133,862 B2 | 11/2006 | Hubert et al. | |
| 7,136,909 B2 | 11/2006 | Balasuriya | |
| 7,139,752 B2 | 11/2006 | Broder et al. | |
| 7,149,732 B2 | 12/2006 | Wen et al. | |
| 7,152,057 B2 | 12/2006 | Brill et al. | |
| 7,171,351 B2 | 1/2007 | Zhou | |
| 7,177,798 B2 | 2/2007 | Hsu et al. | |
| 7,194,455 B2 | 3/2007 | Zhou et al. | |
| 7,197,739 B2 | 3/2007 | Preston et al. | |
| 7,206,780 B2 | 4/2007 | Slackman | |
| 7,209,923 B1 | 4/2007 | Cooper | |
| 7,216,073 B2 | 5/2007 | Lavi et al. | |
| 7,236,968 B2 | 6/2007 | Seki et al. | |
| 7,246,087 B1 | 7/2007 | Ruppelt et al. | |
| 7,249,127 B2 | 7/2007 | Azzam | |
| 7,266,537 B2 | 9/2007 | Jacobsen et al. | |
| 7,269,545 B2 | 9/2007 | Agichtein et al. | |
| 7,293,015 B2 | 11/2007 | Zhou | |
| 7,299,228 B2 | 11/2007 | Cao et al. | |
| 7,313,515 B2 | 12/2007 | Crouch et al. | |
| 2001/0032211 A1 | 10/2001 | Kuzumaki | |
| 2003/0033287 A1 | 2/2003 | Shanahan et al. | |
| 2004/0049499 A1 | 3/2004 | Nomoto et al. | |
| 2004/0064305 A1 | 4/2004 | Sakai | |
| 2004/0122660 A1 | 6/2004 | Cheng et al. | |
| 2004/0254917 A1 | 12/2004 | Brill et al. | |
| 2005/0033711 A1 | 2/2005 | Horvitz et al. | |
| 2005/0060301 A1 | 3/2005 | Seki et al. | |
| 2005/0086045 A1 | 4/2005 | Murata | |
| 2005/0086222 A1 | 4/2005 | Wang et al. | |
| 2005/0114327 A1 | 5/2005 | Kumamoto et al. | |
| 2005/0143999 A1 | 6/2005 | Ichimura | |
| 2005/0256700 A1 | 11/2005 | Moldovan et al. | |
| 2006/0036596 A1 * | 2/2006 | Zhang et al. | 707/5 |
| 2006/0053000 A1 | 3/2006 | Moldovan et al. | |
| 2006/0106788 A1 | 5/2006 | Forrest | |
| 2006/0122834 A1 | 6/2006 | Bennett | |
| 2006/0141438 A1 | 6/2006 | Chang et al. | |
| 2006/0173834 A1 | 8/2006 | Brill et al. | |
| 2006/0204945 A1 | 9/2006 | Masuichi et al. | |
| 2006/0206472 A1 | 9/2006 | Masuichi et al. | |
| 2006/0206481 A1 | 9/2006 | Ohkuma et al. | |
| 2006/0216683 A1 * | 9/2006 | Goradia | 434/322 |
| 2006/0235689 A1 | 10/2006 | Sugihara et al. | |
| 2006/0277165 A1 | 12/2006 | Yoshimura et al. | |
| 2006/0282414 A1 | 12/2006 | Sugihara et al. | |
| 2006/0294037 A1 | 12/2006 | Horvitz et al. | |
| 2007/0022099 A1 | 1/2007 | Yoshimura et al. | |
| 2007/0022109 A1 | 1/2007 | Imielinski et al. | |
| 2007/0073683 A1 | 3/2007 | Kobayashi et al. | |
| 2007/0078842 A1 | 4/2007 | Zola et al. | |
| 2007/0094183 A1 | 4/2007 | Paek et al. | |
| 2007/0094285 A1 | 4/2007 | Agichtein et al. | |
| 2007/0118519 A1 | 5/2007 | Yamasawa et al. | |
| 2007/0136246 A1 | 6/2007 | Stenchikova et al. | |
| 2007/0196804 A1 | 8/2007 | Yoshimura et al. | |
| 2007/0203863 A1 | 8/2007 | Gupta et al. | |
| 2007/0214131 A1 * | 9/2007 | Cucerzan et al. | 707/5 |
| 2009/0287678 A1 | 11/2009 | Brown et al. | |
| 2011/0010365 A1 * | 1/2011 | Garcia et al. | 707/726 |
| 2011/0202334 A1 * | 8/2011 | Abir | 704/4 |

FOREIGN PATENT DOCUMENTS

| | | |
|---|---|---|
| EP | 1 391 834 | 2/2004 |
| EP | 1 653 379 | 5/2006 |
| EP | 1 793 318 | 5/2008 |
| WO | WO 2006/042028 | 4/2006 |

OTHER PUBLICATIONS

"Query expansion", Wikipedia, last modified Jul. 14, 2010, http://en.wikipedia.org/wiki/Query_expansion.

"Relevance feedback", Wikipedia, last modified Aug. 7, 2010, http://en.wikipedia.org/wiki/Relevance_feedback.

"Indri: Language modeling meets inference networks", Lemur, last modified Jun. 21, 2010, http://www.lemurproject.org/indri/.

"Lucene", 2009, http://lucene.apache.org/.

"w3schools.com: HTML 5 Tag Reference", 1999-2010, http://www.w3schools.com/html5/html5_reference.asp.

"Coreference", Wikipedia, last modified Sep. 24, 2010, http://en.wikipedia.org/wiki/Coreference.

"AQUAINT (Advanced Question Answering for Intelligence)", last modified Aug. 5, 2009, http://www-nlpir.nist.gov/projects/aquaint/.

"Document clustering", Wikipedia, last modified Jul. 6, 2010, http://en.wikipedia.org/wiki/Document_clustering.

"Document classification", Wikipedia, last modified Aug. 7, 2010, http://en.wikipedia.org/wiki/Document_classification.

"Chapter 2. Web Search", 2010, http://developer.yahoo.com/search/boss/boss_guide/Web_Search.html#optional_args_web.

Clarke, C. L. A. et al., "The impact of corpus size on question answering performance", Proceedings of the 25th Annual International ACM SIGIR Conference on Research and Development in Information Retrieval, 2002, Abstract only.

Dang, H. T. et al., "Overview of the TREC 2007 question answering track", Proceedings of the Sixteenth Text Retrieval Conference (TREC), 2007.

Mei, Q., et al., "Automatic Labeling of Multinomial Topic Models", Proceedings of the ACM SIGKDD International Conference on Knowledge Discovery and Data Mining, 2007.

Ittycheriah, A. et al, entitled "{IBM}'s Statistical Question Answering System—{TREC}—Text {REtrieval} Conference" in 2001 at ttp://citeseer.ist.psu.edu/cache/papers/cs2/7/http:zSzzSztrec.nist.govzSzpubszSztrec10zSz.zSzpaperszSztrec2001.pdf/ittycheriah01ibms.pdf).

\* cited by examiner

| # | Feature | Type | Level | Description/Motivation |
|---|---------|------|-------|------------------------|
| 1 | TopicLRSeed | Continuous | Nugget | Likelihood ratio estimated with topic and background language models. The topic model is estimated from the seed article, the background model from a large sample of Wikipedia articles. Both models are unigrams with Good-Turing discounting. The likelihood ratio measures the topicality of a text nugget. |
| 2 | TopicLRNuggets | Continuous | Nugget | Similar to TopicLRSeed, but the topic model is estimated from the nuggets that were retrieved for the given topic, and the background model from a large number of nuggets retrieved for different topics. On average, nuggets that were retrieved for the given seed article can be expected to be more topical than nuggets retrieved for other articles, and thus the likelihood ratio should indeed be a measure of topicality. This feature may work better than TopicLRSeed if the seed article is short. |
| 3 | TFIDFSeed | Continuous | Nugget | Average TF*IDF score of the tokens in the nugget. The TF scores are estimated from the seed article, the IDF scores from a large sample of Wikipedia articles. Tokens with high TF*IDF scores are often central to the topic, and thus nuggets that contain them are more likely to be topical. |
| 4 | TFIDFNuggets | Continuous | Nugget | Similar to TFIDFSeed, but the TF scores are estimated from the nuggets that were retrieved for the given topic, and the IDF scores from a large number of nuggets retrieved for different topics. On average, nuggets that were retrieved for the given seed article can be expected to be more topical than nuggets retrieved for other articles, and thus the average TF*IDF score should indeed be a measure of topicality. This feature may work better than TFIDFSeed if the seed article is short. |
| 5 | TopicTokens | Continuous | Nugget | Fraction of the tokens in the Wikipedia article title that occur in the nugget. Each token is weighted by its inverse frequency estimated from a large sample of Wikipedia articles, and weights are normalized to sum to 1. This feature takes into account that nuggets containing topic tokens are more likely to be topical, and that more weight should be given to rare terms. |
| 6 | 3PPronoun | Binary | Nugget | Whether the nugget contains a third person pronoun. A nugget that contains a third person pronoun is more likely to refer to the topic and thus to be topical. |
| 7 | SearchRank | Discrete | Document | Yahoo! search rank of the website that contains the nugget. Documents with small search ranks are more likely to contain topical nuggets. |
| 8 | SearchAbstractCoverage | Continuous | Nugget | Fraction of tokens in the Yahoo! search abstract covered by the nugget. The search engine abstract consists of snippets from the document that match the query. Thus, nuggets that overlap with the abstract are more likely to be relevant. |
| 9 | CharacterLength | Discrete | Nugget | Length of the nugget in characters. Short or very long nuggets are rarely informative. |
| 10 | TokenLength | Discrete | Nugget | Length of the nugget in tokens. Same motivation as for CharacterLength. |
| 11 | NuggetOffset | Discrete | Nugget | Offset of the nugget in the document measured in nuggets. The text at the beginning of a document is often more relevant. |
| 12 | TokenOffset | Discrete | Nugget | Offset of the nugget in the document measured in tokens. Same motivation as for CharacterLength. |
| 13 | TypeTokenRatio | Continuous | Nugget | Ratio of distinct tokens over total number of tokens in the nugget. Some nuggets score high because they repeat topical terms over and over, but they provide little information. This feature is intended to favor nuggets that are less repetitive. |
| 14 | SpecialCharacterRatio | Continuous | Nugget | Ratio of special characters over total number of characters in the nugget. Nuggets that are not in well formed English often contain a large number of special characters. |

55  58  60

| Sources | TREC 8-12 | | | | TREC 13-15 | | | | All | | | |
|---|---|---|---|---|---|---|---|---|---|---|---|---|
| | Passages@20 | | Titles@10 | | Passages@20 | | Titles@10 | | Passages@20 | | Titles@10 | |
| | Recall | Rel | Recall | Rel | Recall | Rel | Recall | Rel | Recall | Rel | Recall | Rel |
| Wikipedia Statistical SE | 59.57% 62.19% ($p < .0001$) | 2.69 2.88 | 28.64% 33.27% ($p < .0001$) | 0.42 0.56 | 52.66% 54.47% ($p = .0020$) | 2.06 2.20 | 18.51% 21.06% ($p = .0040$) | 0.28 0.31 | 57.46% 59.83% ($p < .0001$) | 2.50 2.67 | 25.54% 29.54% ($p < .0001$) | 0.38 0.49 |
| Wiktionary Statistical SE | 26.91% 49.04% ($p < .0001$) | 0.64 1.80 | 9.78% 17.22% ($p < .0001$) | 0.12 0.21 | 15.53% 32.23% ($p < .0001$) | 0.48 0.94 | 1.60% 5.32% ($p < .0001$) | 0.03 0.08 | 23.43% 43.91% ($p < .0001$) | 0.59 1.54 | 7.28% 13.58% ($p < .0001$) | 0.09 0.17 |
| Wiki + Wikt Statistical SE | 60.32% 62.94% ($p < .0001$) | 2.74 2.93 | 28.97% 33.18% ($p < .0001$) | 0.43 0.57 | 52.77% 54.47% ($p = .0147$) | 2.08 2.22 | 18.72% 20.74% ($p = .0197$) | 0.29 0.31 | 58.01% 60.35% ($p < .0001$) | 2.54 2.71 | 25.84% 29.38% ($p < .0001$) | 0.38 0.49 |

SOURCE EXPANSION FOR INFORMATION RETRIEVAL AND INFORMATION EXTRACTION

FIELD OF THE INVENTION

The present invention relates generally to information retrieval and information extraction systems and in particular, to systems and methods that provide an automated way to improve the corpus of data to be used by an information management/retrieval/handling/extraction system.

BACKGROUND

In question answering (QA) systems such as described in http://en.wikipedia.org/wiki/Question_answering, it is common to locally store and index text collections, e.g., encyclopedias and newswire corpora, that are expected to provide reasonable coverage of the information required for a given QA task. However, compared to the Web, these sources are less redundant and may not contain the information sought by a question.

QA systems need to be improved with regard to the following common types of failures: 1) Source failures, i.e. the sources do not contain the information sought by a question. 2) Search and candidate extraction failures, i.e. the system is unable to retrieve or extract a correct answer, often because of insufficient keyword overlap with the question. 3) Answer ranking failures, i.e. the answer is outscored by a wrong answer, often because of insufficient supporting evidence in the sources or because it was ranked low in the search results.

Performing query expansion or using pseudo-relevance feedback in the search can (at most) address the above-mentioned failures of types 2) and 3). In practice, these approaches can introduce noise and may hurt QA performance. Often, they are only applied as a fallback solution if an initial query yields low recall.

While current web search engines typically must be used as black boxes, local sources can be indexed with an open-source IR system such as Indri or Lucene which provide full control over the retrieval model and search results. Local sources can also be preprocessed and annotated with syntactic and semantic information, which can be leveraged in structured queries that better describe the information need expressed in a question. Furthermore, in applications where speed and high availability are important, where the knowledge sources contain confidential data or restricted-domain knowledge, or where a self-contained system is required, a live web search may be infeasible. Moreover, the Web and algorithms used by web search engines change constantly.

While QA systems often utilize the Web as a large, redundant information source, it has also been noted in the QA research community that there are situations where a local search is preferable. For instance, Clarke et al. in the reference entitled "The impact of corpus size on question answering performance" (In Proceedings of the 25th Annual International ACM SIGIR Conference on Research and Development in Information Retrieval, 2002) analyze the impact of locally stored web crawls on a TREC QA dataset. It has been found that large crawls of over 50 GB were required to outperform the 3 GB reference corpus used in TREC, and that performance actually declined if the crawl exceeded about 500 GB.

It would be highly desirable to provide an effective strategy for improving performance of a QA system.

SUMMARY

According to the present invention, there is provided a system, method and computer program product for improving performance of information retrieval and information extraction systems.

In a further aspect, there is provided a source expansion technique for use with information management/retrieval/handling/extraction systems that adds new information to the sources, that adds paraphrases of information that is present in the sources, and that helps by increasing semantic redundancy.

In a further aspect, the method for automatically expanding existing data content that is included in a corpus comprises: automatically generating a search query to search for content related to existing data, the query being generated based on existing data content; automatically retrieving content from one or more data repositories; automatically extracting units of text from the retrieved content; automatically determining a relevance of the extracted units of text and their relatedness to the existing data; and automatically selecting new sources of content and including them in the corpus based on the determined relevance.

In a further aspect, there is provided a system for automatically expanding existing data content that is included in a corpus comprising: a memory storage device; a processor in communication with the memory storage device configured to: automatically retrieve content from one or more data repositories; automatically extract units of text from the retrieved content; automatically determine the relevance of the extracted units of text and their relatedness to the existing data; and automatically select units of text and including them in the corpus based on the determined relevance.

A computer program product is provided for performing operations. The computer program product includes a storage medium readable by a processing circuit and storing instructions run by the processing circuit for running a method. The method is the same as described above.

Further to these aspects, topics are identified in the existing data and topic descriptors are built. A generated search query includes the name of a topic, optional units extracted from the topic descriptor, and an optional projected information need.

Further to these aspects, the determination of the relevance of the text units from the retrieved documents includes scoring each of the text units using a statistical model based on lexico-syntactic features, including: topicality features, search features, and surface features. That is, a statistical approach to Source Expansion is implemented whereby the system, method and computer program product uses statistical models to reduce the size of retrieved web data by several orders of magnitude and filter out noise that negatively impacts QA performance.

Further to this aspect, the system, method and computer program product advantageously enables augmenting domain-specific, confidential or proprietary textual data that is stored locally with a general purpose corpus that may be open and freely available, for example external content such as web data that is pertinent to the locally stored data. Such augmentation improves the timeliness, coverage, redundancy and relevance of presented data when processed using information retrieval systems (including question answering) or information extraction systems (including relation extraction). Similarly, such combined, aggregated data is used to improve organization of data sent to mobile devices, for example, limiting the number of queries needed to obtain relevant information.

The generated expanded corpus is used advantageously, for example, by a question answering (QA) system implemented to answer questions. That is, the corpus is created by starting with existing data, automatically identifying other documents that may have relevant data and automatically retrieving nuggets of content from those other documents. These nuggets are then included in the corpus.

BRIEF DESCRIPTION OF DRAWINGS

The objects, features and advantages of the present invention will become apparent to one skilled in the art, in view of the following detailed description taken in combination with the attached drawings, in which:

FIG. 2 depicts a table including an example set of features for estimating the relevance of text nuggets with regard to a topic in a seed corpus in one embodiment;

DETAILED DESCRIPTION

In one embodiment, there is provided an information management/retrieval/handling/extraction system and in particular, a system and method that provides an automated way to improve the corpus of data to be used by an information retrieval or information extraction system. The corpus is used, for example, by a question answering system of the type such as described in U.S. patent application Ser. No. 2009/0287678 entitled "System and Method for Providing Answers to Questions" the disclosure and contents of which is incorporated by reference as if set forth herein, to answer questions. The corpus is created by starting with existing data, automatically identifying other documents that may have relevant data and automatically retrieving "nuggets" of content from those other documents. As referred to herein, a nugget is a sentence or a passage (including text, alpha-numeric characters, etc.). These nuggets are then included in the corpus if they are determined to be relevant based on a classifier that takes into account a list of features, to be described in greater detail below. In one aspect, a statistical classifier is trained using a machine learning algorithm such as described in http://en.wikipedia.org/wiki/Statistical_classification, incorporated by reference herein, on hand-annotated examples.

Figure 1:
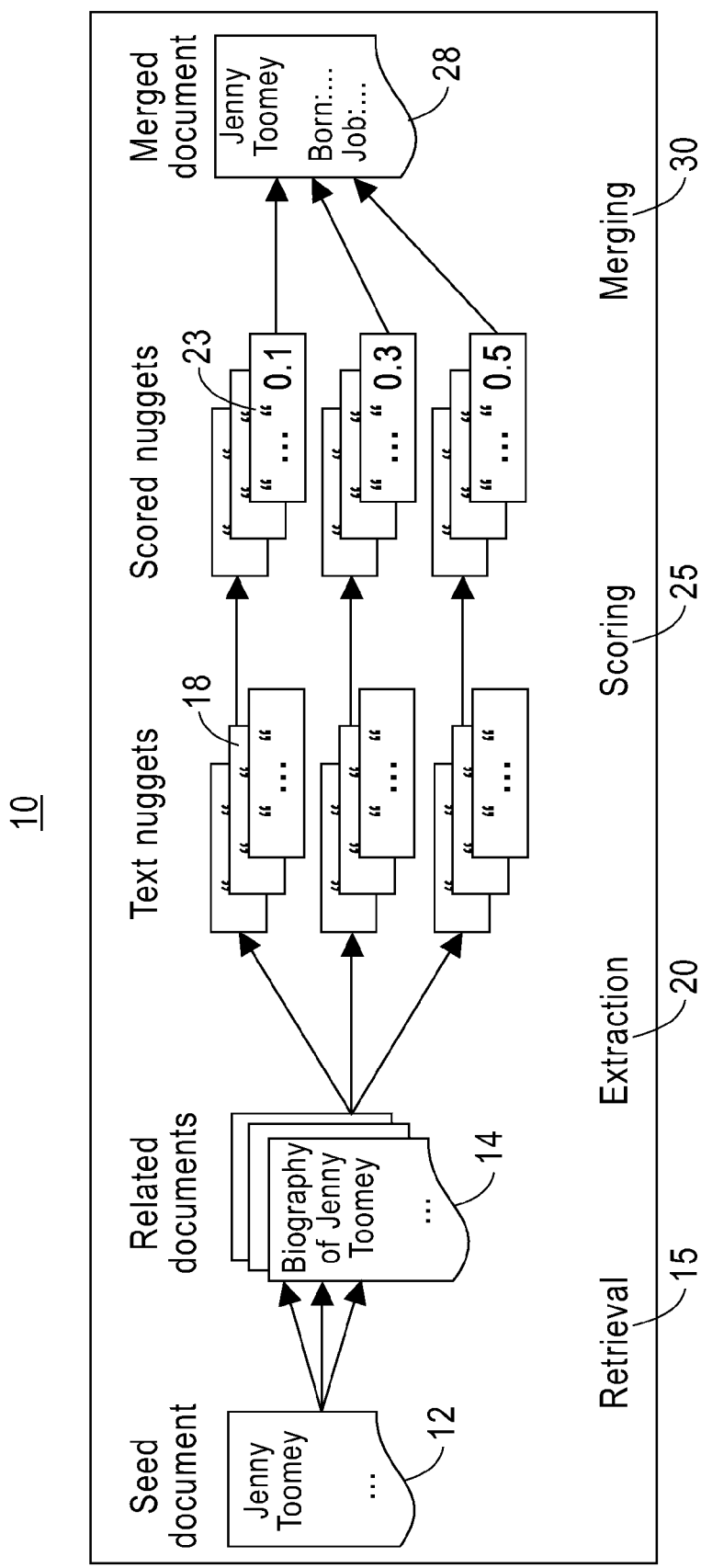
FIG. 1 depicts an example method and system architecture for performing statistical source expansion (SE) according to one embodiment.

FIG. 1 shows a portion of an architecture of a source expansion system 10 for an information retrieval or information extraction system. In one embodiment, the source expansion (SE) system 10 includes a four-stage processing pipeline in which seed documents are expanded according to a source expansion algorithm as described in greater detail.

In the embodiment shown in FIG. 1, the input of the source expansion (SE) algorithm is a topic-oriented corpus, i.e., a collection of documents in which each document is about a known topic. Each of these documents is referred to as a "seed document" or "seed" 12, and the entire document collection is referred to as the "seed corpus". Examples of seed corpora that are suitable for this embodiment of the SE approach are encyclopedias (such as Wikipedia® registered trademark of Wikimedia Foundation, Inc., San Francisco, Calif.) and dictionaries (such as Wiktionary). Note that an alternative implementation of source expansion does not require a topic-oriented corpus, but topics are identified automatically in the seed corpus and topic descriptors are compiled from the seed documents. Also note that the seeds may include a projected "information need" that further specifies what type of information about the topic is of interest. For instance, it may be desired to only include information from related documents that mention a particular term or phrase (e.g., a particular collection of proteins).

As will be explained in greater detail, for each of the seed documents 12, a new pseudo-document 28 is generated from related content extracted from large, unstructured resources. The pseudo-document contains additional relevant information about the topic of the seed as well as paraphrases of information that is already in the seed.

In one aspect, the seed documents 12 are expanded in a multi-stage source expansion system 10 illustrated in FIG. 1. Given a seed 12, the SE system 10 automatically retrieves related documents 14 from other sources, e.g., web-based resources, or non-web-based sources, e.g., a collection of all scientific articles on molecular biology, available locally, in a retrieval stage 15 shown in FIG. 1. The retrieved documents 14 are then automatically split into smaller text "nuggets" 18 during extraction stage 20, and their relevance 23 with regard to the topic of the seed is estimated with a statistical model (scoring stage 25). Finally, a pseudo-document 28 is compiled from the most relevant text nuggets (merging stage 30). These steps are described in more detail below.

In one embodiment, for each seed 12, a retrieval component automatically performs a web search via a search engine (e.g., Yahoo!®) using, in one embodiment, the document title as the query. In one embodiment, there is retrieved a plurality of web pages, e.g., up to 100 web pages, linked from the highest ranked search results. This example implementation is applicable for title-oriented seed corpora, such as Wikipedia®, where the title includes a fully disambiguated description of the topic of an article, but is not suitable for document collections that do not have descriptive titles, such as newswire corpora. This embodiment may also include the retrieval of documents that are directly referenced by the seeds (e.g., by crawling web pages that are referenced though "external links" in Wikipedia® articles).

In the extraction stage 20, an extraction component of the system as described herein below with respect to FIG. 4, splits the retrieved web pages into smaller text nuggets 18, using structural markup, e.g., HTML markup, and/or one or more rules. For example, a rule may specify to split a web page on <p> tags but no splitting of the page on <li> tags to determine and demarcate nugget boundaries. Example types of nuggets are a paragraph, e.g., HTML paragraphs, a phrase, sentence, a narrative of multiple sentences, a table, table cells or list items. They range in length from short fragments (e.g. born: 1968) to narratives of multiple sentences. Since in the merging stage 30 individual text nuggets are selected and added to the pseudo-document, the nuggets are ideally self-contained (i.e. meaningful on their own) and either entirely relevant or entirely irrelevant. Nuggets 18 that are delimited by structural markup are mostly self-contained, but can be partially relevant. Thus the nuggets may be further split into sentences.

That is, nuggets of different granularities may be extracted, including markup-based nuggets (e.g., those split on <p> should include all <li> elements within a paragraph) and sentence level nuggets defined by length (e.g., take all sentences, create nuggets from each sentence of length>16 words).

In the scoring stage 25, one implementation of the SE approach uses a statistical model to score the extracted text nuggets 18 based on their relevance to the topic of the seed document 12. In one example implementation, a set of manually labeled text nuggets was used to fit the model; however, this may be an automated process. In one implementation various features were used that estimate the topicality or textual quality of nuggets and are thus predictive of their relevance. In one embodiment, table 50 shown in FIG. 2 provides for each feature 55 a description and motivation 60, and a categorization 58 with regard to the type (continuous, discrete or binary) and the level at which the feature is computed (documents or individual nuggets). The features fall into three categories: topicality features, search features and surface features. For example, the "topical" features include the following: TopicLRSeed, TopicLRNuggets, TFIDFSeed, TFIDFNuggets, TopicTokens, and 3PPronoun. For example, the TopicLRSeed feature is a likelihood ratio of the nugget estimated with topic and background language models. The topic model is estimated from the seed document, and the background model from a large sample of Wikipedia® articles. Its type and level are indicated as "continuous"/ "nugget". Nuggets with large likelihood ratios are thematically related to the seed. The TopicLRNuggets feature is similar to TopicLRSeed, but the topic model is estimated from the nuggets that were retrieved for the given topic, and the background model from a large sample of nuggets retrieved for different topics. Further, the TFIDFSeed feature is an average "tf.idf score" (term frequency-inverse document frequency of tokens in the nugget. Tokens are word strings and possibly punctuation marks that are relevant (e.g., "Tf-idf scores are used." would produce the 5 tokens "Tf-idf", "scores", "are", "used" and "."). In other embodiments, including implementations of source expansion for languages such as Chinese or Japanese, tokens may be defined e.g. as characters or character n-grams (i.e. groups of "n" characters). The "tf" scores are estimated from the seed document, and the "idf" scores from a large sample of Wikipedia articles (Type=continuous, Level=nugget). The TFIDFNuggets feature is similar to TFIDFSeed, but the "tf" scores are estimated from the nuggets that were retrieved for the given topic, and the "idf" scores from a large sample of nuggets retrieved for different topics. Example "search" features shown in Table 50, FIG. 2 include "SearchRank" and "SearchAbstractCoverage". The SearchRank feature, for example, is the search engine rank (e.g., Yahoo! rank) of the web page the nugget was extracted from (Type=discrete, Level=document). Example "surface" features shown in Table 50, FIG. 2 include "CharacterLength", "TokenLength", "NuggetOffset", "TokenOffset", "TypeTokenRatio" and "SpecialCharRatio". The "CharacterLength" feature for example is the length of the nugget measured in characters and the "TokenLength" feature is the length of the nugget measured in tokens.

Of the fourteen (14) features shown in FIG. 2, the most predictive features use language models (TopicLRSeed and TopicLRNuggets). A major concern is data sparsity when estimating topic models, which, in a further aspect, may be alleviated by using a simple unigram model, with Good-Turing discounting. The TopicLRSeed and TFIDFSeed features utilize the body of the seed, which provides useful information about the relevance of nuggets with regard to the seed.

Figure 3:
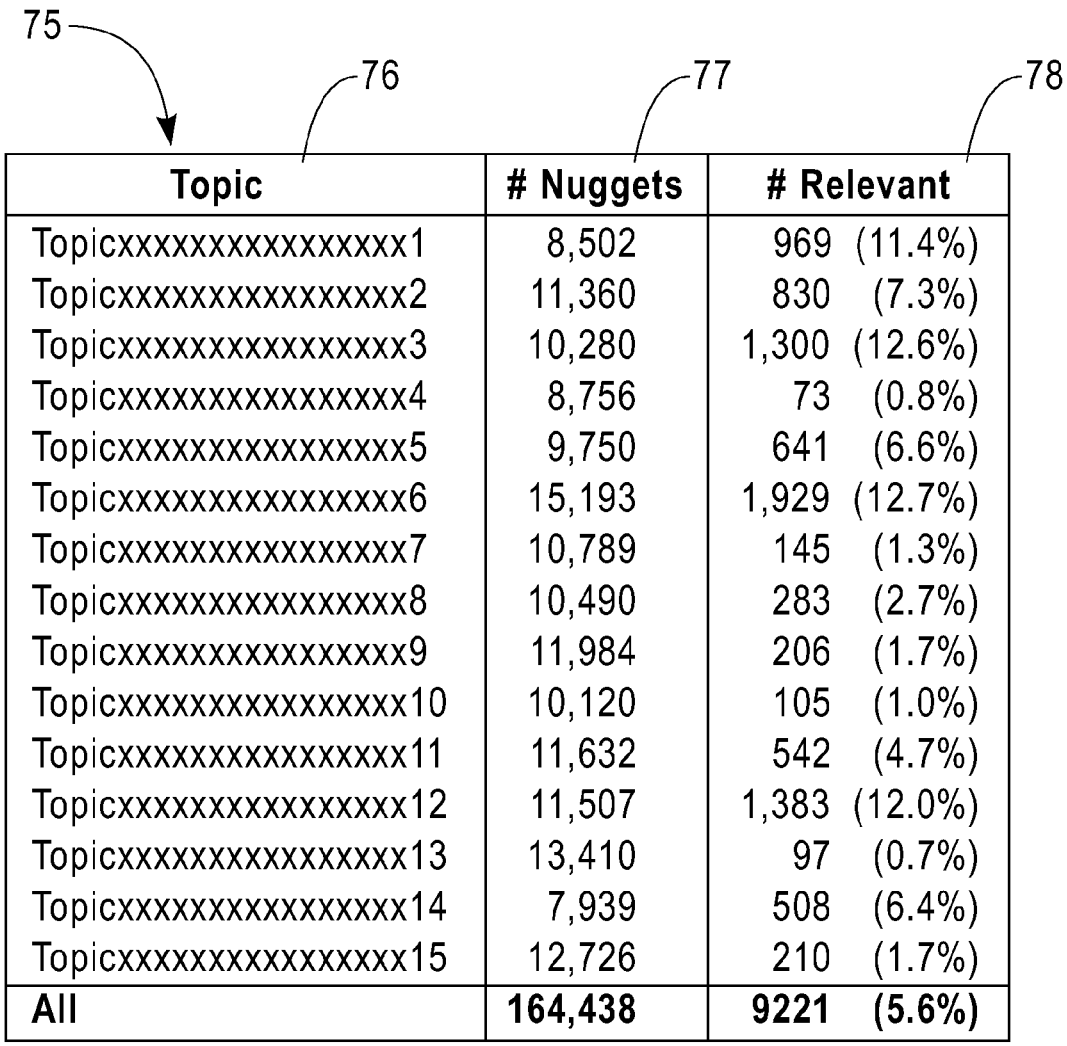
FIG. 3 depicts a table providing a summary of an example nugget scoring dataset, in an example implementation.

In one example implementation, a large dataset of manually annotated web pages was created to evaluate different nugget scoring strategies. For a sample of 15 Wikipedia® articles about people, things and events, an amount of web pages were retrieved (e.g., 100 pages) for each and presented to human annotators with instructions to label relevant substrings. The annotators were given guidelines (not shown) in the form of a checklist for making consistent decisions. A text nugget was considered relevant if at least half of its tokens were selected by an annotator. Table 75, shown in FIG. 3, lists example topics 76 along with the total number of extracted markup-based nuggets 77 and the number of nuggets labeled as relevant 78.

First, a logistic regression (LR) model (e.g. such as found in reference to A. Agresti entitled *Categorical Data Analysis*, Wiley, 2002) is fitted, using the features and dataset described above, to estimate the relevance of each text nugget independently. In one embodiment, a standard logistic regression model using the features listed in the table 50 of FIG. 2 is applied to score text nuggets as follows:

$$f(z)=1/[1+e^{(-z)}]$$

where f(z) is an example probability logistic function used to score and the variable z is a measure of the total contribution of all the independent variables used in the model, i.e., $z=a0+a1 \cdot x1+a2 \cdot x2+ \ldots a14 \cdot x14$, where $x1, \ldots, x14$ are the 14 features listed in the table 50 of FIG. 2, and $a0, \ldots, a14$ are the regression coefficients learned through the training set to best fit the training examples. A token length is just one of these features used.

However, as text nuggets are more likely to be relevant if they are surrounded by other relevant text, there may be added features of adjacent nuggets to the LR model. More precisely, in addition to the original relevance features, the nugget-level features were added (e.g., all features except "SearchRank") of the previous nugget and the next nugget, and then there is performed backward feature selection, e.g., using Akaike's Information Criterion (AIC), to avoid overfitting. In one example, this simple extension yields substantial improvements in nugget scoring performance, particularly when applied to shorter sentence-level nuggets. It is understood that other features of more distant nuggets may be added to a statistical model. In addition, graphical models such as hidden Markov models or conditional random fields can be used to score text nuggets in the context of surrounding nuggets.

Referring back to FIG. 1, the merging component 30 then ranks the text nuggets 18 by their relevance scores in descending order. Alternatively, text nuggets can be arranged in a different order, e.g. the order in which they appear in the retrieved documents. A filter eliminates lexical redundancy by removing nuggets if a given percentage of their tokens (e.g. 95%) are subsumed by higher scoring nuggets or the seed. In addition, nuggets are dropped if their relevance scores are below an absolute threshold, or if the total character length of all nuggets exceeds a threshold that is relative to the length of the seed. Reasonable thresholds can be determined by inspecting a sample of ranked nuggets. The remaining nuggets are compiled into a new "pseudo-document", which can be processed (e.g. indexed and searched with an information retrieval system) along with the original seed.

Figure 4:
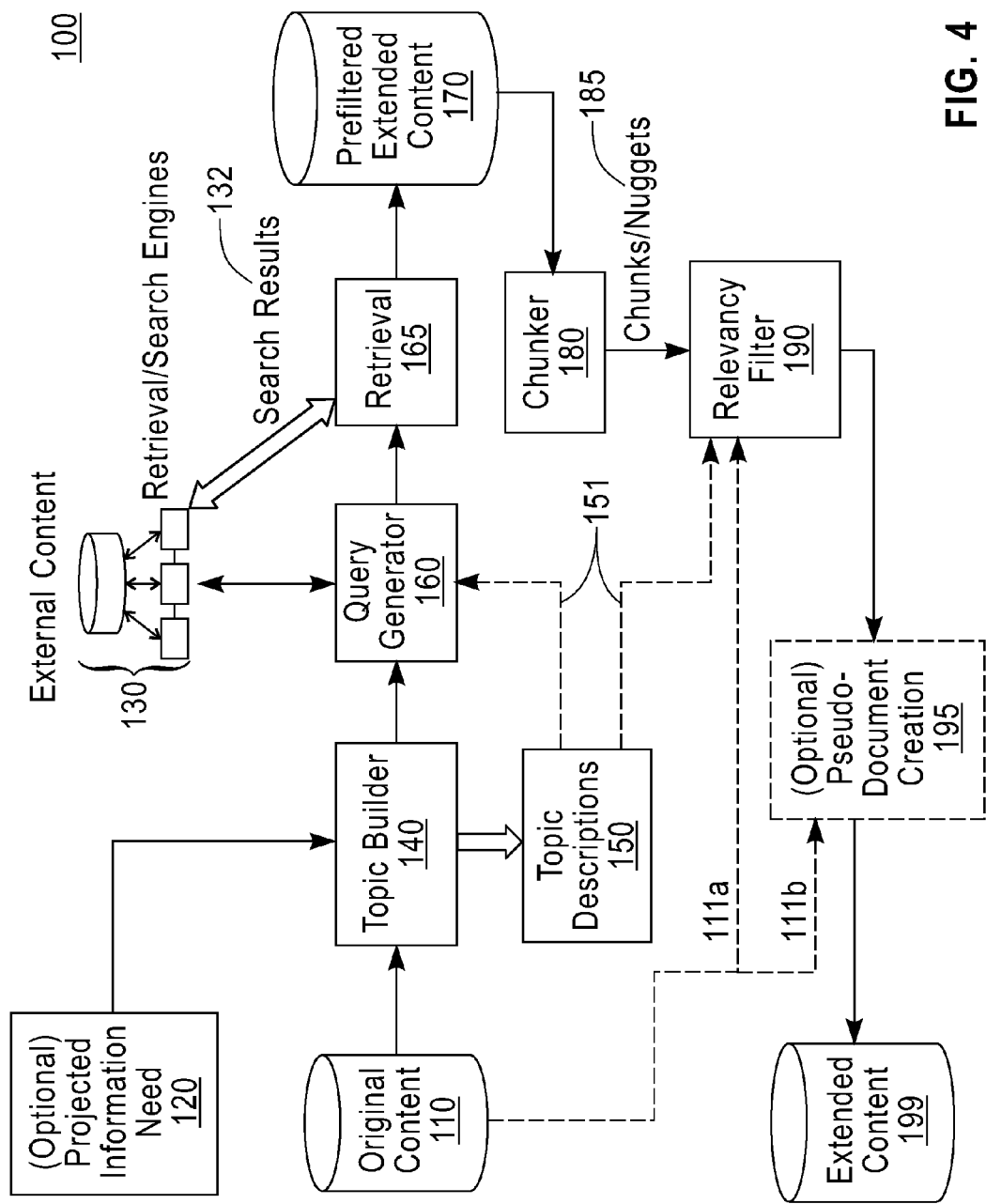
FIG. 4 depicts one example system implementation employing the method steps described in FIG. 1.

One example system implementation employing the method steps described in FIG. 1 is now described herein with respect to FIG. 4. As shown in FIG. 4, the system 100 includes the memory storage or database storage 110 of Original Content that includes, but is not limited to, text documents (for example: a collection of internal documents about products sold by a company, e.g., a consumer goods company or a software company). As the system automatically retrieves and selects information that is related to the original content, it may be desired to further specify the type of information that is of interest. For example, in the case of a stored collection of internal documents about products sold by a company, a user may be desirous to know how the products fail and how customers and service providers are responding to it. This optional request of further information about the original content is encoded as a Projected Information Need 120. In one aspect, a projected information need 120 may be encoded as a word or phrase or ranked lists of words or phrases which can be appended to queries in the process of query generation in 160 in the manner described in greater detail herein. Thus, for example, a projected information need may include an additional phrase that may not be present in the original content but that is descriptive of a particularly relevant aspect of the content, e.g., a word such as "define" (for finding definitions of idiomatic expressions), or "trivia" or "fun fact" (to build a trivia oriented textual corpus), or "how do I fix" (to create a corpus focused on solving problems). Thus, a query can incorporate a projected information need by including additional words or phrases, e.g., query terms+"define"; query terms+"trivia"; query terms+"how do I fix".

With reference to FIG. 4, the original content 110 and the projected information need 120 are available to a Topic Builder module 140, which functions to: (1) identify topics in the original content; and (2) compile for each topic a topic name and a topic descriptor 150 based on the original content and, optionally, based on the projected information need. In topic-oriented sources such as Wikipedia® and Wiktionary, each document corresponds to a topic. The topic name is given by the document title, and the topic descriptor is the document body. For other sources, where titles are missing or not descriptive of the topics, the topic name is extracted from the body of the document using statistical methods. In another situation where a document may cover many topics or a topic may be covered in many documents, topic names can be proposed using dictionaries of known topics (e.g. by selecting substrings of the original content that appear in a dictionary of Wikipedia® titles), patterns (e.g. topic names can be extracted from substrings of the original content that match the pattern "<topic name> is defined as") or statistical methods (such as described by Mei et al. in "Automatic Labeling of Multinomial Topic Models", in Proceedings of the ACM SIGKDD International Conference on Knowledge Discovery and Data Mining, 2007, the whole content and disclosure of which is incorporated by reference as if fully set forth herein). Topic descriptors can then be compiled from segments of the documents that relate to the topics, e.g. paragraphs of text that contain instances of topic names or co-references (http://en.wikipedia.org/wiki/Coreference) to topics. In another embodiment, topic names and topic descriptors are compiled manually by a human expert to address a projected information need (e.g. "trivia knowledge", "product troubleshooting"). Note that not all topics have to be expanded by an SE system, but it is often advisable to limit the expansion, e.g. by selecting the most popular or most recent topics, or topics that match a projected information need (e.g. a user may specifically be interested in topics relating to football, or events that occurred in a given time period). For example, when expanding the dictionary Wiktionary, the frequency of each title of a Wiktionary entry can be looked up in an index of n-grams (http://en.wikipedia.org/wiki/N-gram) with frequency counts extracted from a large text corpus, and only the most frequent entries (e.g. the 100K most frequent entries) can be selected. Any algorithmic method for modifying the original topic list can be applied with an example provided in greater detail herein below. In one embodiment, the output topic names and topic descriptors 150 are represented as text documents, e.g. using a markup language such as XML.

In one embodiment depicted in FIG. 4, the topic builder 140 passes to a Query Generator 160 both the topic name and the projected information need 120. The query generator 160 constructs one or more search queries for one or more Retrieval/Search Engines. These queries can be used to retrieve information that is related to a topic from External Content 130. In one embodiment, the topic name is used as a query. Additional queries can be generated by concatenating the topic name and words or phrases given by the projected information need, as described herein above. For example, a Wikipedia® title "Paris" is concatenated with each of "trivia", "fun facts", "funny facts" or "surprising statistics" to create multiple different search strings. Optionally, as indicated by links 151 in FIG. 4, the query generator may have access to the topic descriptor 150, from which additional query terms may be generated. For example, as a Wikipedia® document title (e.g. "Albert Einstein") may not specify the relevant aspects of a topic, it can be beneficial to include additional words and phrases extracted from the document body (e.g. "physics", "Nobel Prize", "theory of relativity") in the query.

The query generator 160 passes the queries to the Retrieval module 165, which retrieves Search Results 132 from the External Content 130 using one or more Retrieval/Search Engines. In one embodiment, a web search engine (e.g. Google or Yahoo!) is used to retrieve a list of URLs and abstracts from the Web, and the documents pointed to by the URLs are crawled. In another embodiment, locally stored document collections (e.g. newswire corpora or web crawls) are indexed and searched with an information retrieval system such as Indri or Lucene. The search results could, e.g., be used for the expansion of selected Wikipedia® articles, or a documentation of the software Lotus Notes®. The additional retrieved content expands the general popular topics (in the first case), or expands the technical knowledge (in the second case). The search results are collected and stored, e.g., in volatile or non-volatile memory storage, e.g., a database, as Prefiltered Extended Content 170.

As shown in FIG. 4, the prefiltered extended content 170 is processed by a Chunker module 180 that chops or excises crawled content into smaller pieces, e.g., paragraphs or sentences. For example, in one embodiment where the prefiltered extended content includes web pages retrieved using a web search engine, the chunker strips the HTML markup, and obtains chunks, or "nuggets" as referred to herein, which may comprise a paragraph of text, or any sentence longer than 100 characters, for example. In one embodiment, a criterion for determining a chunk or nugget size can be arbitrary or driven by a machine learning algorithm.

The filtered chunks or nuggets 185 are then input into Relevancy Filter module 190, where they are scored and filtered according to relevancy, e.g. following the scoring methodology described herein. Alternatively, any algorithmic method for scoring or selecting nuggets can be applied, including other statistical models, rule-based approaches (e.g. "keep all text nuggets that contain the topic name"), or heuristics for computing scores (e.g. "use the ranks of the nuggets in the search results 132 as scores"). Optionally, the topic descriptor may be used to determine the relevancy of text nuggets, as indicated by links 151. As part of the relevancy filtering process performed by module 190, there is also performed duplicate detection and removal, which is desirable because some nuggets may repeat the content of other nuggets or the topic descriptor 150.

Then there is optionally performed the step Pseudo-Document Creation 195 that consolidates and/or merges the relevant chunks. In the embodiment described herein above, highly scored nuggets are used to create a pseudo-document. In the depicted embodiment, a database or like memory storage device is further compiled to include, after the pseudo-document creation 195, a corpus of Extended Content 199 comprising most relevant text nuggets obtained from the external sources as described herein above. The methods described herein above can be extended to include more sophisticated pseudo-document creation, e.g. applying document summarization techniques (see, e.g., http://en.wikipedia.org/wiki/Automatic_summarization) to the text nuggets.

In a further implementation, in the relevancy filter 190 and in the pseudo-document creation 195, use is made of knowledge of the original content 110 as indicated by links 111*a*, 111*b* that forward the original content. For example, the relevancy filter 190 functions to judge relevance by measuring term overlap with the original content and increase the final scores of some nuggets based on the overlap. The relevancy filter may also remove text nuggets that are already contained in the original content. Link 111*b* is used to include the original content, or parts thereof, in the extended content.

The source expansion (SE) algorithm as described herein was evaluated on a large set of factoid questions from the TREC 8-15 evaluations as described, for example, in a reference to H. T. Dang, D. Kelly, and J. Lin. 2007 entitled "Overview of the TREC 2007 question answering track" in Proceedings of the Sixteenth Text REtrieval Conference (TREC). Factoid questions ask for short, factual answers such as person names, dates or locations. The questions were partitioned into a dataset including independent factoid questions from TREC 8-12, and a dataset comprising series of questions about common topics from TREC 13-15. In the evaluations, answer keys from the NIST website were used. Questions without correct answers were removed from the datasets. A summary of the datasets is given in Table 1 below:

TABLE 1

|  | TREC 8-12 | TREC 13-15 | All |
| --- | --- | --- | --- |
| # Factoid – | 2306 | 995 | 3301 |
| # No Answers = | 169 | 55 | 224 |
| # Used | 2137 | 940 | 3077 |

In the example QA application, two (original content) sources that are both useful for the TREC QA task were expanded: 1) Wikipedia®; and 2) the online dictionary Wiktionary. These sources differ in two significant ways that affect SE: (1) Wiktionary entries are on average much shorter than Wikipedia® articles (780 vs. 3600 characters), and (2) Wiktionary entries are often about more frequently used terms. Queries for common terms yield more noise, which it was attempted to alleviate by adding the keyword "define" to all queries and dropping search results that did not contain the topic in their title or URL.

In an example application of the computer based system shown in FIG. 4 to a question answering (QA) task, the original content 110 (also referred to as "seed corpus" herein) consisted of local copies of Wikipedia® and Wiktionary containing about 2.1 million and 600,000 documents, respectively. The Web was used as external content 130, and the Yahoo! search engine was used to retrieve search results 132.

Figure 5:
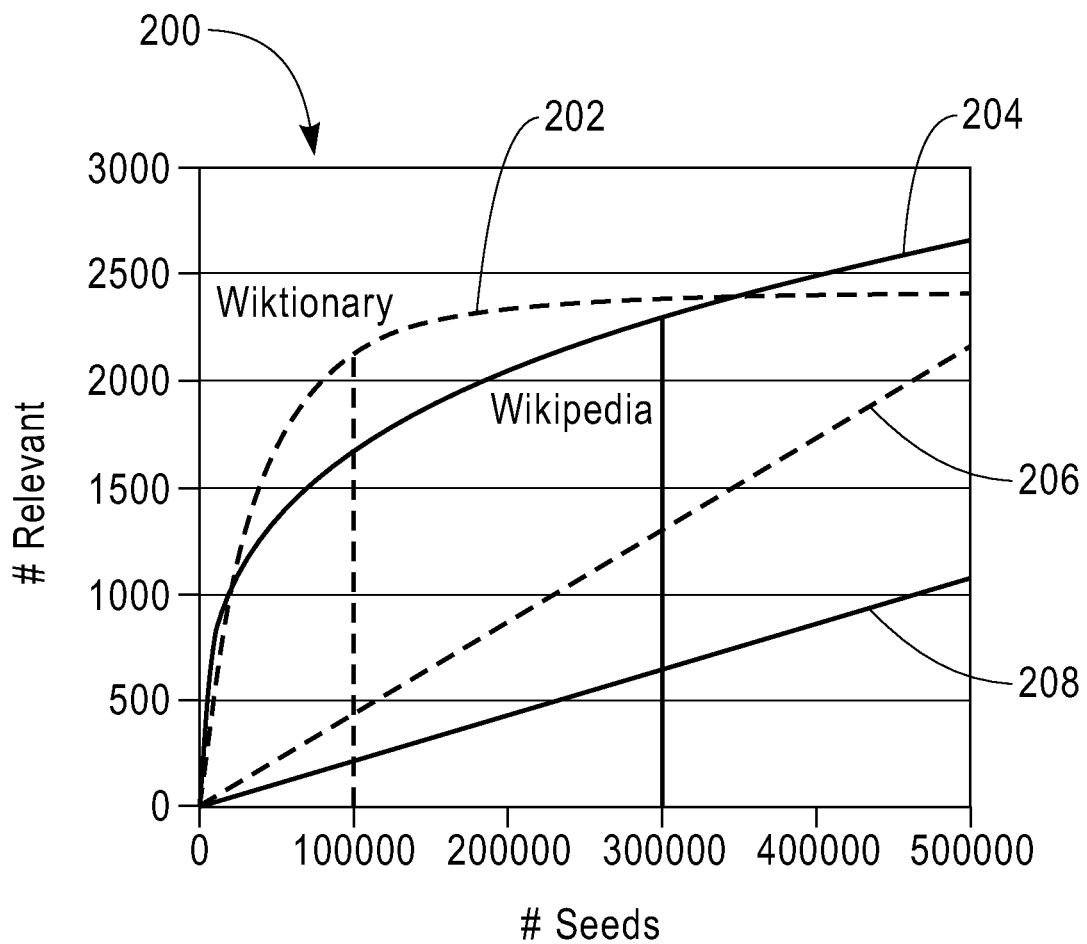
FIG. 5 is a plot depicting the relevance of example Wikipedia® and Wiktionary seeds for the TREC QA task.

To reduce computational costs and to avoid introducing noise, seed documents that were deemed most relevant for the TREC task were expanded. In the example, the questions in TREC included topics such as famous people or well-known events, and thus SE was prioritized to cover the most popular seeds first. The notion of popularity was defined differently for each source. In one embodiment, the popularity of a Wikipedia® article was defined as the number of references from other Wikipedia articles, and the popularity of a Wiktionary entry as its frequency in a large corpus of English text. The seeds were sorted by popularity in descending order and the number of seeds was plotted versus the number of those seeds that are relevant for TREC. A seed was considered relevant if its title was the answer to a question in TREC 8-15. This is an approximation based on its potential impact when only retrieving document titles. FIG. 5 depicts a plot 200 showing relevance curves 202, 204 for both sources Wiktionary and Wikipedia®, respectively, with curves 202, 204 having decreasing slopes, indicating that popularity-based rankings had outperformed random rankings of the seeds, which are illustrated by the respective straight lines 206, 208 for both sources Wiktionary and Wikipedia®, respectively. The top 300,000 Wikipedia® articles and 100,000 Wiktionary entries were expanded, restricting the size of the generated pseudo-documents to at most 5 or 10 times the length of the seeds, respectively. Text nuggets were scored using the model with features of adjacent instances as described herein, trained on all 15 topics in Table 75, shown in FIG. 3. Nuggets with relevance scores below 0.1 were filtered out. Overall, there were processed about 40 million web pages, totaling about 2 TB of web data and 4 billion text nuggets. The SE algorithm condensed the web data by two orders of magnitude, yielding an expanded corpus (shown as extended content 199 in FIG. 4) that can be indexed and searched on a single node. The sizes of the seed corpora and expanded corpora are given in Table 2 below.

TABLE 2

| Source | # Docs | Size |
| --- | --- | --- |
| Wikipedia | 2,114,707 | 7.0 GB |
| Expanded Wikipedia | 100,000 | 4.8 GB |
|  | 200,000 | 7.6 GB |
|  | 300,000 | 9.8 GB |
| Wiktionary | 565,335 | 420 MB |
| Expanded Wiktionary | 100,000 | 590 MB |

The impact of SE on the TREC QA task was evaluated using expanded versions of Wikipedia® and Wiktionary that were generated as described herein above. Queries consisting of keywords and phrases were generated from the TREC questions using OpenEphyra, and the seed corpora and expanded corpora were indexed and searched with the open-source IR system Indri. Two complementary search strategies were evaluated: (1) retrieve passages comprising 50 word tokens and adjust them to align with sentence boundaries, and (2) fetch documents and use their titles as results. The title search targets questions asking for an entity that matches a given description, such as "What is the fear of lightning called?" (TREC 11, Question 1448). Search results were judged as relevant if a substring matched the answer key, and performance was evaluated in terms of search recall (Recall) and the average number of relevant results per question (Rel). Search recall is defined as the percentage of questions with relevant search results. Statistical SE was compared to the seed corpora without expansion.

Figure 6:
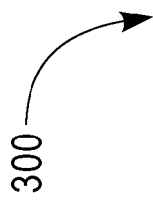
FIG. 6 depicts a table showing the impact of SE using original search engine rankings and statistical SE for different sources, search strategies and datasets.

Table 300 in FIG. 6 shows the search recall and average number of relevant results per question for the seed corpora (sources Wikipedia® 301, Wiktionary 303) and statistical SE 309, 311 for search results consisting of 20 passages and 10 titles. SE yields consistent performance gains, independently of the sources, search strategy and dataset. Even if a seed corpus with good coverage for the given QA task is available, such as Wikipedia® for TREC, SE improves performance significantly. If a corpus with lower coverage is expanded, such as Wiktionary, drastic gains are possible. Recall also improved on every individual TREC dataset (i.e. TREC 8, 9, . . . , 15; not shown in these aggregate results).

To demonstrate the impact of statistical SE on final QA accuracy (the percentage of questions answered correctly), the approach was evaluated using a QA system that leverages its sources (1) by retrieving passages and document titles for candidate answer extraction, and (2) by performing additional searches for supporting evidence for the top candidates during an answer scoring phase.

Table 3 shows corpus sizes and QA accuracies on the TREC 11 dataset for different seed corpora and expanded sources. The second row represents a collection of sources including Wikipedia® and other encyclopedias, Wiktionary and other dictionaries, web crawls that target specific domains (e.g. movies and actors), and newswire corpora (e.g. the AQUAINT (Advanced Question Answering for Intelligence at http://www-nlpir.nist.gov/projects/aquaint/) reference corpus used in the TREC 11 evaluation). Only Wikipedia® and Wiktionary were expanded in this second experiment. SE increases QA accuracy significantly (p <0.01). The results in the second row show that even when adding conventional web crawls and newswire sources including the TREC 11 reference corpus to the baseline, statistical SE can yield substantial performance gains.

TABLE 3

|  | No Expansion | | Expansion | |
| --- | --- | --- | --- | --- |
|  | Size | Acc | Size | Acc (Gain) |
| Wikipedia | 7 GB | 51.6% | 17 GB | 58.0% (+12.4%) |
| All sources | 21 GB | 57.2% | 32 GB | 61.5% (+7.5%) |

As an example application of the above method, the system shown in FIG. 4 was implemented to consider an example TREC Question: "What female leader succeeded Ferdinand Marcos as president of the Philippines?" A question answering system that uses Wikipedia® as its information source would have two natural places to search for an answer: Wikipedia® articles on "Ferdinand Marcos" and "President of the Philippines". In this example, the article on Ferdinand Marcos does not mention "female" and the succession is expressed as "drove Marcos into exile and installed Corazon Aquino as the new president". Thus, it is hard to automatically match the relevant portion of this article with the question. Nor, in this example, has it been found that the article on "President of the Philippines" is a good match (for similar reasons). Additionally, in this example, while the Wikipedia® article on Corazon Aquino contains all the terms of the question, they do not appear together, and some of them are not used in accordance with the intended meaning of the question. The term "leader" appears several times, but not modified by the word female; "succeeded" occurs in "a huge rally which succeeded in thwarting then President Fidel Ramos' . . . "; the intended meaning of "succeeded Ferdinand Marcos as president" is expressed as "the ouster of Marcos from power grabbing and the installation of Aquino as president of the Philippines". There is a limited chance to automatically find and justify the answer to the question, even though the information is—implicitly—in at least three Wikipedia® articles.

The source expansion methodology and system overcomes this problem by providing: (a) additional short paraphrases of the information; (b) repetition of the important information. By implementing the SE methodology, i.e.: 1) preparing queries for retrieving related content based on existing data (e.g., titles of existing documents or entities extracted from documents can be used as queries); 2) retrieving content from other repositories of unstructured, semi-structured, or structured data (e.g., web pages can be retrieved using existing search engines); 3) extracting smaller units of text from the retrieved content (e.g., web pages are split into coherent paragraphs of text); 4) judging the quality of the smaller units of text and their relatedness to existing data (e.g., paragraphs can be scored using a statistical model based on lexico-syntactic features and topic models); and 5) compiling pseudo-documents from the high-scoring text units, expanded source content is created such that the answer may be automatically found.

For instance, with reference to FIG. 4, there was initially considered an off-line copy of Wikipedia® as Original Content 110. Given that the original Wikipedia® articles only partially match the terms used in the example question, there was a Projected Information Need 120 for additional data, e.g., further content about the most referenced Wikipedia® articles (e.g., 250K articles). Information which articles are most referenced is available through link analysis of Wikipedia® itself. Alternatively, other popularity measures could be used such as PageRank® (link analysis algorithm available from Google Inc.). In one embodiment, the Topic Builder 140 is configured to extract titles from every article and filter them based on the popularity metric. The topic builder also generates Topic Descriptors 150 that may, for example, consist of a pointer to the original document, the number of entries to retrieve, and the title. Example topic descriptors are shown below:

```
 . . .
1006661 500 Corazon Aquino
100927 500 The Blues Brothers
101146 500 Mayor
10166 500 Enron
 . . .
101777 500 Philippines
 . . .
101703 500 River Avon
 . . .
102174 500 Ferdinand Marcos
 . . .
```

In this example, the number preceding is the pointer to the original document, and the 500 is the number of Search Results 132 requested from the search engine. These topic descriptors are input to Query Generator 160, which generates queries for each item. For example, the topic descriptor "1006661 500 Corazon Aquino" gets translated into a query, e.g., a Yahoo! BOSS API query such as:
http://boss.yahooapis.com/ysearch/web/v1/Corazon
    %20Aquino?appid=123456ABC&abstract=1
    ong&type=html,txt,xml,-pdf,-msword,-ppt&count=500.
Example queries may specify keywords, filters and other parameters as described in http://developer.yahoo.com/search/boss/boss_guide/Web_Search.
    html#optional_args_web.

The queries generated are automatically run against External Content source 130. In one embodiment, the generated queries are input to a web search engine such as Yahoo! BOSS (http://developer.yahoo.com/search/boss/), and a list of highest ranked search results (e.g. 500 results) consisting of URLs and abstracts are retrieved. In this example, the Retrieval module 165 then crawls the web pages references by the URLs for storage in results repository 170, e.g., a database including retrieved expanded source content.

Continuing in the example, the Chunker 180 then automatically divides the retrieved data into chunks/nuggets such as "Corazon Aquino, who became the first female president of the Philippines by ending Ferdinand Marcos . . . ", "Corazon Aquino, who became the first female President of the Philippines (and the first in Asia), Marcos, and his allies departed", and "Aquino served as President of the Philippines, succeeding Ferdinand Marcos", which are then scored and filtered by Relevancy Filter module 190.

New sources are then synthesized from high-quality related text (e.g., paragraphs that score above a threshold can be concatenated into new pseudo-documents). In the example, the chunk or nugget "Corazon Aquino, who became the first female President of the Philippines (and the first in Asia), Marcos, and his allies departed" would be included into a pseudo-document about "Corazon Aquino", generated by 195, and which document would be included in Extended Content repository 199 (memory storage or database). The pseudo-document would also contain other nuggets related to "Corazon Aquino", such as the nuggets mentioned above, and, optionally, the original article (referenced by 1006661).

It should be understood that other embodiments are not limited to information retrieval (i.e., search, of which QA is one instance), but may also improve information extraction (e.g. relation detection). For example, source expansion as described herein is also applicable to build additional source content for information extraction (IE). For instance, an IE system may be given a corpus of original content (e.g. a collection of documents about a particular topic, e.g., football teams) with the goal to extract instances of relations (e.g. pairs of players and their teams). Source expansion is utilized to extend the original content and build a larger corpus that contains more instances of a relation (e.g. additional players and teams) as well as reformulations of existing content that facilitate the extraction of instances already mentioned in the original corpus. An IE system that leverages the extended content can extract more instances of a relation with higher precision.

In addition, the invention can be applied to other text analysis tasks. For example, in document clustering (http://en.wikipedia.org/wiki/Document_clustering) or document classification (http://en.wikipedia.org/wiki/Document_classification), the documents can first be extended with related content by performing automatic source expansion. The extended content can then be used to build document models, e.g. multinomial distributions (http://en.wikipedia.org/wiki/Multinomial_distribution) over words, which are used to measure the similarity between documents and to assign documents to clusters or classes.

It should be understood that while examples are herein provided in English, the invention is also applicable to original content 110, projected information needs 120 and external content 130 in other languages including, but not limited to, other European languages such as German or French, or Asian languages such as Chinese or Japanese.

Figure 7:
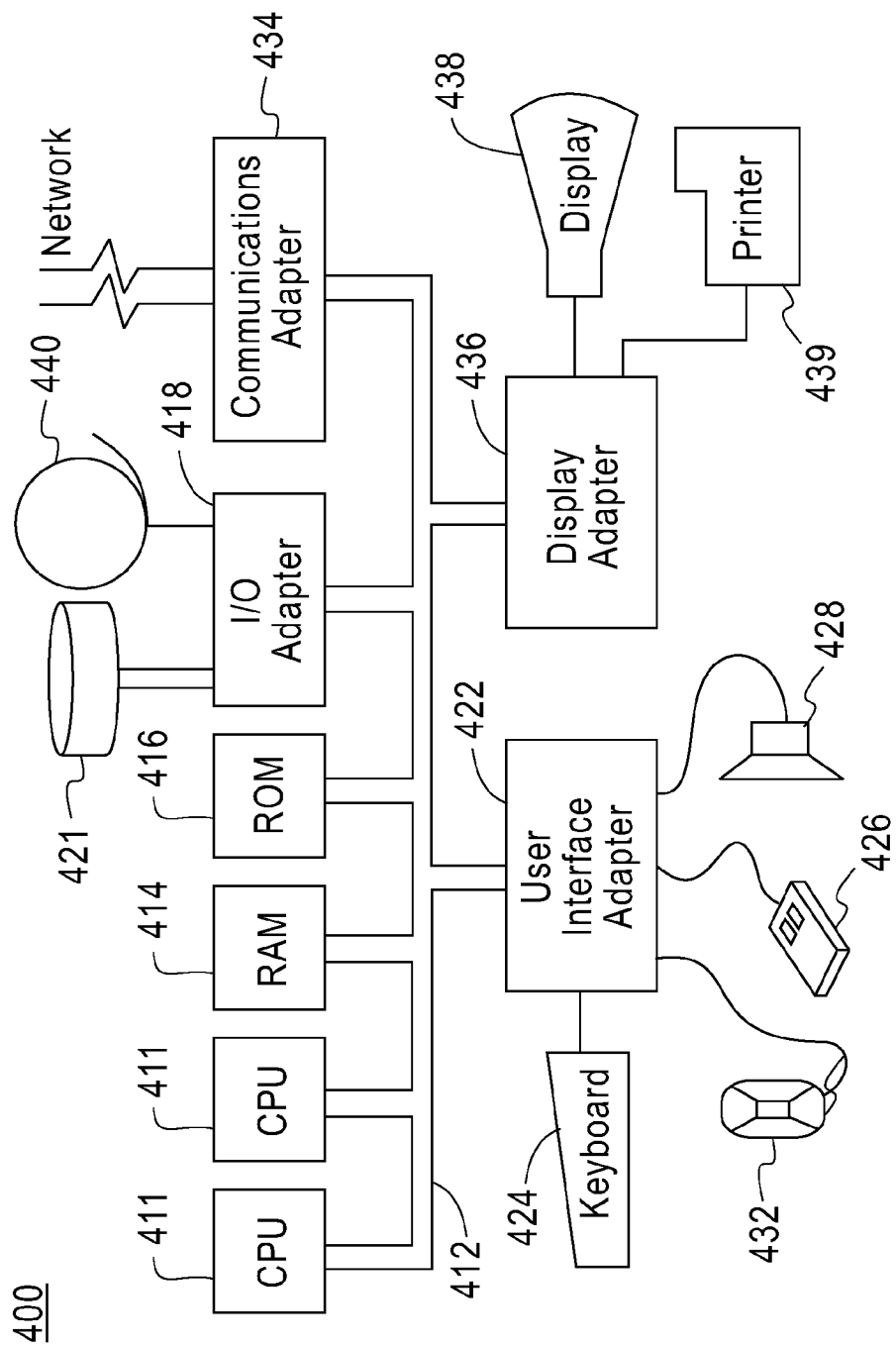
FIG. 7 illustrates an exemplary hardware configuration performing a method for expanding and improving a corpus of data, i.e., source expansion (SE), in an information management/retrieval/handling/extraction system in one embodiment.

FIG. 7 illustrates an exemplary hardware configuration of a computing system 400 running and/or implementing the method steps described herein. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an intranet, a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory),.an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations (e.g., FIG. 1 or FIG. 4) and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

The invention claimed is:

1. A method for automatically expanding existing data content that is included in a corpus comprising:
   automatically identifying a topic from existing data in said corpus;
   automatically generating search queries to search for content related to said topic identified from said existing data, the queries being generated based on said topic identified from existing data content in said corpus;
   using said generated search queries for automatically conducting a search in and retrieving content from one or more other data repositories not including said corpus;
   automatically extracting units of text from the retrieved content;
   automatically determining a relevance of the extracted units of text and their relatedness to the topic identified from the existing data;
   automatically selecting new sources of content and including them in the corpus based on the determined relevance to said identified topic including compiling a new document from the most relevant extracted text units, said new document being searchable with said existing data content, wherein the existing data content includes one or more seed documents, said automatically identifying a topic comprising:
   generating from said one or more seed documents, a topic name and a topic descriptor corresponding to units extracted from said one or more documents, said generated search queries including one or more: said topic name or words and phrases extracted from said topic descriptor, and
   wherein said retrieving content includes: running, using one or more search engines, said search queries against the one or more external data repositories, said content retrieved including one or more text passages or documents;
   said extracting units of text comprising: splitting the retrieved text passages or documents into smaller text units, said splitting using structural markup for demarcating text unit boundaries; and
   said determining the relevance of the extracted text units from said retrieved passages or documents including: scoring each said text unit using a statistical model based on a lexico-syntactic feature, said lexico-syntactic feature includes a topicality feature, a search feature and a surface feature;
   wherein said automatically determining a relevance of the extracted units includes fitting a logistic regression (LR) model using said topicality, search and surface features and a generation level to estimate a relevance score of each independent text unit based on their relevance to said topic of the seed document; and
   said scoring further including: computing a likelihood ratio of a text unit estimated with a topic model and a background language model, said topic model being estimated from the seed document, and said background language model being estimated from a sample of documents from said corpus, wherein one or more process or units in communication with a memory storage device performs said generating, retrieving, extracting, relevance determining and selecting.

2. The method as claimed in claim 1, further comprising: generating said topic name and said topic descriptor using one or more dictionaries of known topics, patterns or statistical methods.

3. The method as claimed in claim 1, further comprising:
specifying a projected information need in the form of words, text strings, phrases or ranked lists of words or phrases not in the existing data content; and,
said generated search queries optionally including words and phrases extracted from said projected information need.

4. The method as claimed in claim 1, further comprising: determining, from a text unit, one or more tokens, said scoring based on a topicality feature includes computing an average tf.idf (term frequency—inverse document frequency) score of said tokens, a (tf) score being estimated from said seed document, and an (idf) score being estimated from a sample of documents.

5. The method as claimed in claim 1, wherein each said topicality lexico-syntactic feature is specified as one of: a continuous, binary or discrete type feature, and as being generated at one of: a document level or text unit level, said fitting a logistic regression (LR) model using said topicality, search and surface features at one of said continuous, binary or discrete types and a generation level.

6. The method as claimed in claim 1, wherein said determining the relevance of the text units from said retrieved passages or documents includes using graphical models and other statistical models, rule-based approaches and heuristics.

7. The method as claimed in claim 1, further comprising: automatically extending content of said corpus to include content of text units having scores above a pre-determined threshold.

8. The method as claimed in claim 1, further comprising: automatically extending content of said corpus to include content of text units using an automatic summarization method.

9. The method as claimed in claim 1, wherein said topic and background language model is a simple unigram model with Good-Turing discounting.

10. A system for automatically expanding existing data content that is included in a corpus comprising:
memory storage device;
a processor in communication with said memory storage device configured to:
automatically identify a topic from existing data in said corpus, said existing data comprising one or more seed documents;
automatically generate search queries to search for content related to said topic identified from said existing data, the queries being generated based on said topic identified from a seed document in said corpus;
using said generated search queries to automatically conduct a search in and retrieve content from one or more other data repositories not including said corpus;
automatically extract units of text from the retrieved content;
automatically determine a relevance of the extracted units of text and their relatedness to the topic identified from the existing data; and
automatically select new sources of content and include them in the corpus based on the determined relevance to said identified topic including compiling a new document from the most relevant extracted text units, said new document being searchable with said existing data content, wherein to automatically identify said topic, said processor is further configured to:
generate from said one or more seed documents, a topic name and a topic descriptor corresponding to units extracted from said one or more documents, said generated search queries including one or more: said topic name or words and phrases extracted from said topic descriptor, and wherein to retrieve content, said processor is further configured to:
use search engines to run said search queries against the one or more external data repositories, said content retrieved including one or more text passages or documents;
extract units of text by splitting the retrieved text passages or documents into smaller text units using structural markup for demarcating text unit boundaries; and, said processor further configured to:
determine the relevance of the text units from said retrieved passages or documents by scoring each said text unit using a statistical model based on a lexico-syntactic feature, said lexico-syntactic feature includes a topicality feature, a search feature and a surface feature;
wherein to automatically determine a relevance of the extracted units includes fitting a logistic regression (LR) model using said topicality, search and surface features and a generation level to estimate a relevance score of each independent text unit based on their relevance to said topic of the seed document; and
compute a score based further on a topicality feature by one of: computing a likelihood ratio of a text unit estimated with a topic model and a background language model, said topic model being estimated from the seed document, and said background language model being estimated from a sample of documents from said corpus.

11. The system as claimed in claim 10, wherein the existing data content includes one or more documents, said processor further configured to:
generate from said one or more documents, a topic name or a topic descriptor corresponding to units extracted from said one or more documents, said generated search queries including one or more: said topic name or words and phrases extracted from said topic descriptor.

12. The system as claimed in claim 11, wherein said topic name and said topic descriptor are generated using one or more dictionaries of known topics, patterns or statistical methods.

13. The system as claimed in claim 11, wherein said processor is further configured to:
receive a projected information need in the form of words, text strings, phrases or ranked lists of words or phrases not in the existing data content; wherein said generated search queries optionally include words and phrases extracted from said projected information need.

14. The system as claimed in claim 10, wherein said processor is further configured to determine, from a text unit, one or more tokens, said scoring based on a topicality feature includes computing an average tf.idf (term frequency-inverse document frequency) score of said tokens, a (tf) score being estimated from a seed document, and an (idf) score being estimated from a large sample of documents.

15. The system as claimed in claim 10, wherein said processor is configured to automatically generate a new document to include content of text units having score above a pre-determined threshold.

16. The system as claimed in claim 10, wherein said processor is further configured to: automatically extend content of said corpus to include content of text units using an automatic summarization method.

17. The system as claimed in claim 10, wherein each said topicality lexico-syntactic feature is specified as one of: a continuous, binary or discrete type feature, and as being generated at one of: a document level or text unit level, said fitting a logistic regression (LR) model using said topicality, search and surface features at one of said continuous, binary or discrete types and a generation level.

18. The system as claimed in claim 10, wherein said topic and background language model is a simple unigram model with Good-Turing discounting.

19. A computer program device for automatically expanding existing data content that is included in a corpus, the computer program device comprising a non-transitory storage medium readable by a processing circuit and storing instructions run by the processing circuit for performing a method, the method comprising:
   automatically identifying a topic from existing data in said corpus; automatically generating search queries to search for content related to said topic identified from said existing data, the queries being generated based on said topic identified from said existing data content in said corpus;
   using said generated search queries for automatically conducting a search in and retrieving content from one or more other data repositories not including said corpus;
   automatically extracting units of text from the retrieved content;
   automatically determining a relevance of the extracted units of text and their relatedness to the topic identified from the existing data; and
   automatically selecting new sources of content and including them in the corpus based on the determined relevance to the identified topic including compiling a new document from the most relevant extracted text units, said new document being searchable with said existing data content, wherein the existing data content includes one or more seed documents, said automatically identifying a topic comprising:
   generating from said one or more seed documents, a topic name and a topic descriptor corresponding to units extracted from said one or more documents, said generated search queries including: said topic name or words and phrases extracted from said topic descriptor, and
   wherein said retrieving content includes: running, using one or more search engines, said search queries against the one or more external data repositories, said content retrieved including one or more text passages or documents;
   said extracting units of text comprising: splitting the retrieved text passages or documents into smaller text units, said splitting using structural markup for demarcating text unit boundaries; and
   said determining the relevance of the text units from said retrieved passages or documents including: scoring each said text unit using a statistical model based on a lexico-syntactic feature, said lexico-syntactic feature includes a topicality feature, a search feature and a surface feature;
   wherein said automatically determining a relevance of the extracted units includes fitting a logistic regression (LR) model using said topicality, search and surface features and a generation level to estimate a relevance score of each independent text unit based on their relevance to said topic of the seed document; and
   said scoring is based further on a topicality feature including: computing a likelihood ratio of a text unit estimated with a topic model and a background language model, said topic model being estimated from a seed document, and said background language model being estimated from a sample of documents in said corpus.

20. The computer program device as claimed in claim 19, wherein said topic name and said topic descriptor are generated using one or more dictionaries of known topics, patterns or statistical methods.

21. The computer program product as claimed in claim 19, wherein each said topicality lexico-syntactic feature is specified as one of: a continuous, binary or discrete type feature, and as being generated at one of: a document level or text unit level, said fitting a logistic regression (LR) model using said topicality, search and surface features at one of said continuous, binary or discrete types and a generation level.

22. The computer program product as claimed in claim 19, wherein said topic and background language model is a simple unigram model with Good-Turing discounting.

23. A method for automatically expanding existing data content that is included in a corpus comprising:
   automatically identifying a topic from existing data in said corpus;
   automatically generating search queries to search for content related to said topic identified from said existing data, the queries being generated based on said identified topic;
   using said generated search queries for automatically conducting a search in and retrieving content from one or more other data repositories not including said corpus;
   automatically extracting units of text from the retrieved content;
   automatically determining a relevance of the extracted units of text and their relatedness to the topic identified from said existing data; and
   automatically selecting new sources of content and including them in the corpus based on the determined relevance to said identified topic including compiling a new document from the most relevant extracted text units, said new document being searchable with said existing data content,
   wherein the existing data content includes one or more seed documents, said automatically identifying a topic comprising:
   generating from said one or more documents, a topic name and a topic descriptor corresponding to units extracted from said one or more documents, said generated search queries including: said topic name or words and phrases extracted from said topic descriptor, and
   wherein said retrieving content includes: running, using one or more search engines, said search queries against the one or more external data repositories, said content retrieved including one or more text passages or documents;
   said extracting units of text comprising: splitting the retrieved text passages or documents into smaller text units, said splitting using structural markup for demarcating text unit boundaries; and
   said determining the relevance of the text units from said retrieved passages or documents including: scoring each said text unit using a statistical model based on a lexico-syntactic feature, said lexico-syntactic feature includes a topicality feature, a search feature and a surface feature;

wherein said automatically determining a relevance of the extracted units includes fitting a logistic regression (LR) model using said topicality, search and surface features and a generation level to estimate a relevance score of each independent text unit based on their relevance to said topic of the seed document; and said scoring is based further on a topicality feature including: computing a likelihood ratio of a text unit estimated with a topic model and a background language model, said topic model being estimated from text units retrieved for a given topic, and said background language model being estimated from a sample of text units retrieved for different topics identified in documents of said corpus, wherein one or more processor units in communication with a memory storage device performs said generating, retrieving, extracting, relevance determining and selecting.

24. The method as claimed in claim 23, further comprising: generating said topic name and said topic descriptor using one or more dictionaries of known topics, patterns or statistical methods.

25. The method as claimed in claim 23, further comprising:

specifying a projected information need in the form of words, text strings, phrases or ranked lists of words or phrases not in the existing data content, said generated search queries optionally including words and phrases extracted from said projected information need.

26. The method as claimed in claim 23, wherein each said topicality lexico-syntactic feature is specified as one of: a continuous, binary or discrete type feature, and as being generated at one of: a document level or text unit level, said fitting a logistic regression (LR) model using said topicality, search and surface features at one of said continuous, binary or discrete types and a generation level.

27. The method as claimed in claim 23, further comprising: automatically extending content of said corpus to include content of text units having scores above a pre-determined threshold, or include content of text units using an automatic summarization method.

* * * * *